Patented Dec. 6, 1949

2,490,260

UNITED STATES PATENT OFFICE 2,490,260

PREPARATION OF CATALYTICALLY INACTIVE INORGANIC OXIDE PARTICLES

Charles H. Ehrhardt, Western Springs, Ill., assignor to Universal Oil Products Company, Chicago, Ill., a corporation of Delaware No Drawing. Application May 28, 1947, Serial No. 751,116

6 Claims. (Cl. 252—454)

This invention relates to the preparation of catalytically inactive inorganic oxide particles and more particularly to the preparation of inorganic oxide particles which are particularly suitable for use as a diluent in the catalytic conversion of hydrocarbons.

A particularly advantageous process for the conversion of hydrocarbons, and still more particularly the catalytic cracking of heavier oils to produce gasoline, is the moving bed type of process in which the hydrocarbons and catalyst are passed either concurrently or countercurrently through a reaction zone. One of the more successful moving bed types of process is the fluidized process in which the hydrocarbons and catalyst are maintained in a state of turbulence under hindered settling conditions. Other satisfactory moving bed processes include the compact moving bed type in which a bed of catalyst moves either concurrently or countercurrently to the hydrocarbons to be converted, and the slurry type operation in which the catalyst is carried as a slurry in the hydrocarbons.

The conversion of hydrocarbons and particularly the cracking of higher boiling oils, such as kerosene, gas oil, fuel oil, reduced crude, topped crude, etc., may be effected in the presence of an active cracking catalyst. While naturally occurring aluminum silicates, such as Super Filtrol, particularly when acid or otherwise treated to improve the activity, are satisfactory catalysts, it has been shown that higher octane gasoline products are obtained by a synthetically prepared catalyst such as silica-alumina, silica-magnesia, silica-zirconia, silica-thoria, silica-alumina-magnesia, silica-alumina-zirconia, silica-alumina-thoria, etc.

While the synthetic cracking catalyst produces higher octane gasolines, higher yields of gaseous hydrocarbons and of carbon are likewise produced in the conventional processes. In order to obtain high gasoline yields without simultaneously increasing gas and carbon production, it has been proposed to operate the process at a low conversion per pass. By cracking at a low conversion per pass, a more selected cracking is obtained; that is, the charging stock is cracked to form gasoline and the reaction products are removed from the conversion zone before secondary cracking of the gasoline to lower boiling gaseous products or to carbon occurs. This results in a high process efficiency and, in addition to producing higher yields of gasoline and smaller amounts of gas, means that there is less carbon to be burned during the regeneration of the catalyst and, therefore, less oxygen consumption, less compression and pumping costs, smaller size regenerator equipment, and less opportunity for the development of high temperatures in the regeneration zone which may result in permanently deactivating the active catalyst.

In order to obtain low conversion per pass and still maintain the bed in a fluidized state, it is proposed to commingle a catalytically inactive diluent with the active catalyst. The diluent serves not only to decrease the quantity of active catalyst in the conversion zone, but also serves as a valuable heat carrying medium. The inert diluent preferably should be of substantially the same size, shape and density as the active catalyst and should not contain rough edges which may cause erosion of the plant equipment. It should not exert a catalytic activity of its own which may result in a lower octane number product. In addition, the inert diluent must not melt or otherwise disintegrate under the conditions employed in the hydrocarbon conversion process.

An object of the present invention is to prepare an inorganic oxide particle which is of substantially the same size, shape and density as the active catalyst.

In a broad embodiment the present invention relates to a method of preparing a catalytically inactive inorganic oxide particle which comprises forming an inorganic oxide particle, commingling said particle with an organo-metallic compound having a high organic to metal ratio, and thereafter removing the organic portion of said organo-metallic compound.

In a specific embodiment the present invention relates to a method of preparing catalytically inactive silica spheres, which comprises commingling an acid with water glass under conditions to form silica spheres, soaking said spheres in a soap solution, removing the spheres from excess solution, and calcining the spheres at a high temperature to burn off the organic portion of the soap molecule.

When utilized for the cracking of hydrocarbons, a preferred active catalyst comprises spherical particles. While comparably large size spheres of from about $\frac{1}{32}$ to about $\frac{1}{4}$ inch in diameter may be employed, preferred spheres are of microspherical size and range from about 20 to about 150 microns in diameter. The spherical catalysts are readily manufactured by commingling an acid, such as sulfuric acid, hydrochloric acid, etc., with an alkali metal silicate and particularly water glass, and then passing the mixture in the form of droplets through a nozzle or from a rotating disc into an oil bath, the pH of the mixture being controlled so that the silica sets to a firm hydrogel during its passage through the bath. The silica may then be washed to remove sodium ions and, either before or after drying, impregnated with a suitable salt, such as aluminum sulfate, aluminum nitrate, magnesium sulfate, magnesium nitrate, etc., and the corresponding oxide developed in and upon the silica either by the addition of a suitable precipitating agent, such as ammonium hydroxide, or by heating under conditions to decompose the salt to the oxide. In another method the catalyst spheres may be formed by co-precipitation methods employing the oil drop technique.

When utilized in connection with spherical cracking catalysts, the inert diluent preferably comprises silica spheres. The silica spheres may readily be formed by commingling an acid with water glass and passing the droplets into an oil bath as hereinbefore set forth. The silica spheres are then treated in accordance with the present invention to form the desired inert diluent.

In accordance with the invention, the silica spheres are commingled with an organo-metallic compound having a high organic to metal ratio. Preferred organo-metallic compounds comprise alkali metal soaps and particularly the fatty acid soaps such as the sodium, potassium and lithium salts of such fatty acids as oleic, linoleic, stearic, linolinic and palmitic acids, etc. Other suitable organo-metallic compounds include the so-called soapless detergents such as (1) the alkylsulfonate salts as, for example, sodium cetanesulfonate, sodium laurylsulfonate, etc., (2) the alkanol sulfate esters such as the monosodium salts of the sulfate esters of octyl, lauryl and cetyl alcohols, etc., (3) the aralkyl sulfonates of both the mono- and polynuclear aromatics and their homologs as, for example, the alkali metal salts of decyl-, dodecyl-, hexadecyl-, and octyldecylbenzene sulfonic acid, sodium tetralinsulfonic acid and sodium isopropylnaphthalenesulfonic acid, etc., (4) the alkali metal salts of the sulfonated fatty acid glycerides, such as the sodium and potassium salts of the triglyceride esters of oleic, stearic, palmitic and margaric-sulfonic acids, (5) the alkylated phenolsulfonates such as the sodium sulfonate salt of butylphenylphenol, etc., (6) the alkylaminesuccinate and sulfosuccinate salts such as the alkali metal salts of dioctylsulfosuccinate, etc., (7) the alkyl, aromatic and alkylaromatic phosphonate salts such as sodium laurylphosphonate, sodium dodecylbenzenephosphonate, etc., (8) the alkali metal sulfonate salts of carboxamide derivatives such as the sodium sulfonate salt of dimethyloleylamide, etc.

It is understood that the above is merely a partial enumeration of the various organo-metallic compounds which may be employed within the broad scope of the present invention but not necessarily with equivalent results.

After the spheres have been allowed to soak in the soap solution until the proper amount of alkali metal ion is adsorbed, the spheres are removed from excess solution, dried at a temperature of from about 200° to 500° F. for a period of from about 2 to 24 hours and then are calcined at a high temperature to burn off the organic portion of the soap molecule. The final calcining temperature will vary with the particular soap molecule employed, but will generally be within the range of about 1000° to about 1800° F. for a period ranging from about 2 to about 12 hours.

It has been found that silica spheres treated in the above manner are of substantially the same density as active catalyst spheres comprising silica and a catalytically active metal oxide as formed in the manner hereinbefore set forth. These silica spheres are of very low cracking activity and are particularly suitable for use in a fluidized process employed for the cracking of heavy oil to produce gasoline.

While the above description has been directed primarily to the formation of spherical particles, it is understood that the broad embodiment of the invention contemplates similar treatment of inorganic oxide particles of any desired shape. For example, granules of silica of irregular size and shape may be formed by commingling a suitable acid with water glass and then grinding or otherwise breaking the silica mass into small particles. Further, it is understood that, while the heretofore description has been directed primarily to the treatment of silica particles, the present invention may be applied to the treatment of other inorganic oxide particles, including the oxides of aluminum, magnesium, zirconium, thorium, vanadium, copper, iron, nickel, cobalt, etc.

Catalytic cracking reactions may be effected at temperatures within the range of about from 800° to about 1100° F. at superatmospheric pressures ranging from atmospheric to about 50 pounds, or more, per square inch. In accordance with the present invention, the conversion per pass is maintained low and preferably is below about 50%. The unconverted material is separated within the process and recycled for further conversion preferably utilizing a recycle ratio (defined as the ratio of the volume of oil being recycled to the volume of fresh oil introduced from an extraneous source) of at least 2:1.

While the description of the present invention has been directed primarily to the cracking of hydrocarbon oils, it is understood that the novel features of the present invention are applicable to other hydrocarbon conversion reactions, including particularly catalytic dehydrogenation of hydrocarbons. Catalytic dehydrogenation is effected at temperatures of from about 900° to about 1200° F. and generally in the presence of catalysts comprising alumina composited with chromia, molbdena, vanadia, etc. These catalysts likewise may be formed by separate, successive or co-precipitation methods. Butanes or normally liquid paraffin hydrocarbons such as pentanes, hexanes, heptanes, octanes, etc., may be subjected to dehydrogenation to form the corresponding olefins and/or di-olefins, cyclohexanes may be dehydrogenated to form aromatics or hexane and higher boiling hydrocarbons may be subjected to dehydrogenation-cyclization to form aromatic hydrocarbons. Also included within the scope of the invention are reforming operations in which a mixture of liquid hydrocarbons and particularly straight run gasoline, thermally cracked gasoline, etc., is subjected to conversion to form a gasoline having improved antiknock characteristics. The reforming process may be effected in the presence or absence of hydrogen.

The process of the present invention may be effected in any suitable equipment. Catalytic cracking units are well known in the art and, therefore, do not require detailed description. In general, the fluidized process includes a reactor, a regenerator and fractionating equipment. The temperature of the hot regenerated catalyst is usually sufficient to vaporize and crack the charging oil in the reactor. The spent catalyst composition is withdrawn from the reactor and supplied to the regenerator wherein carbon is burned from the catalyst by means of air or other oxygen-containing gases. The hydrocarbon products, after separation from the catalyst by means of cyclone separators, Cottrell precipitators or otherwise, are subjected to fractionation for the recovery of gases, gasoline and higher boiling products. In accordance with the invention, the higher boiling products are preferably recycled to the reactor in an amount of at least two volumes thereof to one volume of fresh charging oil. The normally gaseous products will be high in olefins and therefore may be subjected to polymerization, alkylation or other reactions to increase the volume of high octane gasoline.

The following examples are introduced to further illustrate the novelty and utility of the present invention but not with the intention of unduly limiting the same.

*Example I*

A catalyst diluent was prepared as follows: Silica microspheres were prepared by adding sulfuric acid to water glass and the mixture was dispersed from a rotating disc into an oil bath. The silica set to firm hydrogel spheres during passage through the oil bath and was carried from the forming tower by means of a water layer disposed beneath the oil bath. The wet spheres were washed with acidulated water to remove sodium ions, were soaked in a solution of sodium oleate (5 grams per liter) and then vacuum dried. The spheres were then dried overnight in an oven at 300° F., calcined at 1112° F. for two hours and finally calcined at a temperature of about 1550° F. for 6 hours in a muffle furnace.

The microspheres so prepared had an apparent bulk density of 0.47 and exerted practically no catalytic activity. When the catalytic activity of the spheres was tested by passing Mid-Continent gas oil of 31° A. P. I. gravity over the catalyst at a temperature of 932° F. and at a weight hourly space velocity of 4, the weight per cent conversion of the gas oil amounted to only 1.6. The weight hourly space velocity is defined as the weight of oil per hour per weight of catalyst in the cracking zone.

Silica microspheres prepared in a similar manner but without treatment with sodium oleate were utilized to manufacture active cracking catalysts. The silica spheres were composited with about 10% by weight of alumina. The silica-alumina catalyst is of approximately the same size, shape and apparent bulk density and, when utilized for the cracking of the Mid-Continent gas oil under the same conditions of operation as hereinbefore set forth, will effect a weight per cent conversion of at least 25.

It will be noted from the above data that silica microspheres formed in accordance with the present invention are particularly suitable for use as a diluent because they are of substantially the same size, shape and density as the active cracking catalyst but are substantially catalytically inert.

*Example II*

Another batch of inert diluent was prepared in substantially the same manner as that described in Example I except that the concentration of the sodium oleate solution was 25 grams per liter. This batch of diluent had an apparent bulk density of 0.58 and, when tested for its cracking activity in the same manner as hereinbefore set forth, effected a weight per cent conversion of only 1.7.

In comparison with the low density inert diluent prepared in accordance with the present invention, river sand which has been proposed for use as an inert diluent, has an apparent bulk density of 1.49 which is approximately three times the average density of active cracking catalysts. In addition, river sand is not of the desired spherical shape and therefore causes excessive erosion of plant equipment.

I claim as my invention:

1. A method of preparing a catalyst diluent which comprises forming inorganic oxide particles, commingling said particles with a solution of an organo-metallic compound containing an alkali metal, and thereafter calcining said particles to burn off the organic portion of said organo-metallic compound.

2. A method of preparing a catalyst diluent which comprises forming inorganic oxide spheres, commingling said spheres with a solution of an organo-metallic compound containing an alkali metal, removing excess solution, and calcining the spheres to burn off the organic portion of said organo-metallic compound.

3. A method of preparing a catalyst diluent which comprises forming silica spheres, soaking said spheres in an alkali metal soap solution, removing excess solution from the spheres, and calcining the spheres at a high temperature to burn off the organic portion of the soap molecule.

4. A method of preparing a catalyst diluent which comprises forming silica spheres, withdrawing the silica spheres in an alkali metal soap solution, removing excess soap solution from the spheres, drying the spheres at a temperature of from about 200° to about 500° F., and finally calcining the spheres at a temperature of from about 1000° to about 1800° F.

5. A method of producing a catalyst diluent which comprises soaking silica spheres in a solution of an alkali metal salt of a soap-forming fatty acid, removing excess solution, and calcining the spheres at a temperature sufficient to burn off the organic portion of said salt.

6. A method of producing a catalyst diluent which comprises soaking silica spheres in a solution of an alkali metal sulfonated organic compound, removing excess solution, and calcining the spheres at a temperature sufficient to burn off the organic portion of said compound.

CHARLES H. EHRHARDT.

REFERENCES CITED

The following references are of record in the file of this patent:

UNITED STATES PATENTS

| Number | Name | Date |
| --- | --- | --- |
| 1,675,308 | Jaeger | June 26, 1928 |
| 1,996,320 | Luft | Feb. 7, 1933 |
| 1,962,733 | Davidson | June 12, 1934 |
| 2,229,353 | Thomas et al. | Jan. 21, 1941 |
| 2,384,943 | Marisic | Sept. 18, 1945 |
| 2,400,176 | Thiele | May 14, 1946 |